United States Patent
Rennuit

(10) Patent No.: US 11,369,983 B2
(45) Date of Patent: Jun. 28, 2022

(54) AUTOMATON FOR TREATING A SURFACE

(71) Applicant: LES COMPANIONS, Lille (FR)

(72) Inventor: Antoine Rennuit, Wasquehal (FR)

(73) Assignee: Les Companions, Lille (FR)

( * ) Notice: Subject to any disclaimer, the term of this patent is extended or adjusted under 35 U.S.C. 154(b) by 2 days.

(21) Appl. No.: 16/096,772

(22) PCT Filed: Apr. 28, 2017

(86) PCT No.: PCT/FR2017/051018
§ 371 (c)(1),
(2) Date: Oct. 26, 2018

(87) PCT Pub. No.: WO2017/187105
PCT Pub. Date: Nov. 2, 2017

(65) Prior Publication Data
US 2019/0118209 A1    Apr. 25, 2019

(30) Foreign Application Priority Data

Apr. 29, 2016    (FR) .................................... 16 53918

(51) Int. Cl.
| | |
|---|---|
| *B05B 13/04* | (2006.01) |
| *B25J 9/16* | (2006.01) |
| *B25J 11/00* | (2006.01) |
| *B25J 13/06* | (2006.01) |
| *B05B 12/00* | (2018.01) |
| *B05B 13/00* | (2006.01) |

(52) U.S. Cl.
CPC .......... *B05B 13/0431* (2013.01); *B05B 12/00* (2013.01); *B05B 13/005* (2013.01); *B25J 9/1671* (2013.01); *B25J 11/0065* (2013.01); *B25J 11/0075* (2013.01); *B25J 13/06* (2013.01)

(58) Field of Classification Search
CPC .................................................. B05B 13/0431
See application file for complete search history.

(56) References Cited

U.S. PATENT DOCUMENTS

| | | | | |
|---|---|---|---|---|
| 5,429,682 A | * | 7/1995 | Harlow, Jr. ........... | B05B 7/0815 118/316 |
| 5,739,806 A | * | 4/1998 | Hissen ................. | G05B 19/042 118/323 |
| 6,071,346 A | * | 6/2000 | Yamauchi ........... | B05B 12/1463 118/302 |

(Continued)

FOREIGN PATENT DOCUMENTS

| | | |
|---|---|---|
| EP | 2862678 A2 | 4/2015 |
| JP | S6211908 A | 1/1987 |

*Primary Examiner* — Justin S Lee
(74) *Attorney, Agent, or Firm* — Calfee, Halter & Griswold LLP

(57) ABSTRACT

The present invention provides an automaton (1) for treating a surface for treatment, the automaton comprising treatment means (10), e.g. an arm, having a movable end (12) configured to treat a surface, and an interface configured to indicate to the automaton the surface that is to be treated. The interface includes a screen (21) configured to display a representation of at least a portion of the surroundings in which the surface for treatment is to be found, and the interface is configured to enable a person to select the surface for treatment on the representation displayed on the screen (21).

16 Claims, 4 Drawing Sheets

(56) References Cited

U.S. PATENT DOCUMENTS

| | | | |
|---|---|---|---|
| 6,484,121 B1* | 11/2002 | Filev | B05B 12/12 |
| | | | 118/668 |
| 2011/0264266 A1* | 10/2011 | Kock | B25J 9/1676 |
| | | | 700/253 |
| 2013/0343640 A1* | 12/2013 | Buehler | B25J 9/163 |
| | | | 382/155 |
| 2014/0135986 A1* | 5/2014 | Kanehara | B25J 9/1671 |
| | | | 700/257 |
| 2014/0303775 A1* | 10/2014 | Oh | G05D 1/0033 |
| | | | 700/253 |
| 2015/0147460 A1* | 5/2015 | Manzi | B05B 12/122 |
| | | | 427/8 |
| 2015/0375390 A1* | 12/2015 | Becroft | B24B 27/0007 |
| | | | 427/427.2 |
| 2016/0052296 A1* | 2/2016 | Grimes | B05B 13/0405 |
| | | | 347/110 |
| 2016/0275702 A1* | 9/2016 | Reynolds | G06F 3/04845 |
| 2017/0032060 A1* | 2/2017 | Davidi | B05B 12/124 |
| 2018/0264640 A1* | 9/2018 | Holloway | B05B 12/122 |

* cited by examiner

AUTOMATON FOR TREATING A SURFACE

BACKGROUND

The present disclosure relates to an automaton for treating a surface, e.g. for painting it. More particularly, the present disclosure relates to an interface of controlling such automaton.

Robots already exist for treating a surface, e.g. for painting it or sanding it. Such robots are used in particular in the automobile industry for painting vehicle bodywork. Such robots are independent and they are programmed to perform a series of operations without oversight from an operator: they then replace one or more people by performing the tasks that have previously been programmed in the computer controlling the robot.

Nevertheless, such robot painters, just like other robots used on assembly lines, are stationary on the ground and only the arm holding the tool moves: their range of action is thus geographically limited. Furthermore, in order to avoid accidents with any people who might be in the proximity of robots, robots are generally surrounded by a safety zone in which they are to work and that should not be entered by individuals.

Robots also exist in the building industry. Such robots are used in particular for working in locations that are difficult for individuals to access, and possibly even prohibited. This applies for example when the surface for treatment comprises a high ceiling or is situated in a zone where there is a danger of radiation. An example of a robot suitable for acting under such conditions is described in particular in application FR 2 902 038.

It can be seen that the robot is then directly controlled by an operator in order to treat the surface, with the robot taking the place of the operator and being under the operator's control. Thus, such robots are not independent and they need to be controlled continuously by an operator: the use of such a robot then serves to facilitate the tasks of the operator, but continues to require the operator to be present, whether beside the robot or remotely. The robot then does not replace the operator who is to perform the operation, but acts rather as a tool that remains under the control of the operator and that does not act on its own.

Thus, the robot does not enable work to be performed instead of and replacing an individual, but requires constant supervision. In particular, the robot can treat a given surface only as a result of instructions given by the operator while said surface is being treated so as to adapt the actions being carried out by the robot in real time.

SUMMARY

The present disclosure seeks to solve the various above-mentioned technical problems. In particular, the present disclosure seeks to provide means for indicating to said automaton the work that it is to perform in autonomous manner. More particularly, the present disclosure seeks to provide an interface that makes it easier for an operator to give instructions.

Thus, in an aspect of the disclosure, there is provided an automaton for treating a surface for treatment, the automaton comprising treatment means, e.g. an arm, having a movable end configured to treat a surface, and an interface configured to indicate to the automaton the surface that is to be treated. In particular, the interface includes a screen configured to display a representation of at least a portion of the surroundings in which the surface for treatment is to be found, and the interface is configured to enable a person to select or draw the surface for treatment on the representation displayed on the screen.

By means of its interface, it becomes easy for the operator to indicate to the automaton which surfaces it is to treat in autonomous manner. In particular, the interface is configured so as to be intuitive and simple to use. Not only does it facilitate inputting instructions, but it also facilitates verifying instructions before the automaton starts working.

Preferably, the automaton is for use in a professional environment, and in particular for uses in industry and in building.

Preferably, the surface for treatment is an inside surface, e.g. a surface inside a room, and the screen is configured to display a representation of at least a portion of the room in which the surface for treatment is to be found. In other words, the surroundings of the surface for treatment then comprise the room in which the surface for treatment is to be found.

Preferably, the surface for treatment is a surface of an object located in a room, and the screen is configured to display a representation of at least a portion of the room in which the object is to be found together with the object itself, which may also be shown. In other words, the surroundings of the surface for treatment then comprise the room in which the object having the surface for treatment is to be found. The object for treatment may be included therein.

Alternatively, the surface for treatment is an outside surface, e.g. a facade portion of a building, and the screen is configured to display a representation of at least a portion of the facade of the building. In other words, the surroundings of the surface for treatment then comprise the facade surrounding or constituting the surface for treatment.

Preferably, the surface for treatment is the surface of one or more walls or facades, of one or more ceilings, of one or more objects, and/or one or more arbitrary surfaces.

Preferably, the screen is configured to display a three-dimensional representation of at least a portion of the surroundings in which the surface for treatment is to be found. The term "three-dimensional representation" is used to mean a representation in which the user can move, the representation complying with the various proportions of the displayed elements, and in particular in perspective. Such a three-dimensional representation enables the user in particular to modify the viewing angle from which the surroundings are displayed on the screen, while still having a representation that maintains true proportions. The user can thus move over the screen in the portion of the surroundings as though the user were genuinely there. This makes it easier to visualize the various surfaces of the portion of the surroundings, and where appropriate makes it easier to select them for treatment.

Preferably, the interface is also configured to display, e.g. graphically or with text, information about the operation of the automaton, e.g. its operating parameters or any anomalies. The interface then enables dialog between the automaton, which is to operate in autonomous manner, and the operator in charge of monitoring its operation. By indicating the operating parameters and anomalies, if any, it is ensured that the automaton operates as desired and it is possible to anticipate potential future problems, if any (e.g. refilling with paint).

In a first embodiment, the interface is configured to identify, in the portion of the surroundings that is displayed on the screen, at least one determined surface that is surrounded by a closed outline. In this first embodiment, the interface is capable of identifying the various surfaces represented on its screen. Thereafter, such an identification makes it possible in particular for the operator to select the surfaces for treatment by selecting surfaces that are identified by the interface.

Preferably, the interface is configured to enable a person: to select the surface for treatment by selecting, on the representation displayed on the screen, at least one determined surface surrounded by a closed outline, and possibly to exclude at least a portion of said determined surface that is not to be treated by selecting, on the representation displayed on the screen, a determined portion surrounded by a closed outline that is situated inside said determined surface. As mentioned above, since the various surfaces of the zone for treatment are identified by the interface, it then suffices for the operator to select the surfaces that are to be treated, and possibly also those that are not to be treated, in order to enable the interface to have its working instructions. Furthermore, the interface can also specify on the screen which surfaces the operator has selected or excluded in order to facilitate verification of the instructions given to the automaton.

In another embodiment, the interface is configured to enable a person: to select the surface for treatment by making at least one closed outline on the representation displayed on the screen in order to define a defined surface, and optionally to exclude at least a portion of said defined surface that is not to be treated, by making a closed outline on the representation displayed on the screen in order to define a defined portion situated inside said defined surface. In this embodiment, it is the operator who selects surfaces for treatment by making the outline of said surface for treatment. Nevertheless, the precision with which surfaces for treatment are selected may be limited by the way in which the outline is made, and this can require more time than the first embodiment, in order to ensure that the boundaries indicated on the interface do indeed correspond to the desired boundaries.

Preferably, the interface is configured to identify at least one singularity in the portion of the surroundings displayed on the screen, e.g. one or more corners or one or more edges. The interface is also configured to modify the closed outline of at least one defined surface so as to make it correspond with one or more of said singularities. Under such circumstances, the interface adapts the outline made by the operator so as to cause it to match with elements that the interface can identify. In particular, when using a discrete geometrical model of the surroundings, i.e. a model in the form of a set of points, the interface can then cause certain portions of the outline drawn by the operator to correspond with one or more singularities in the surroundings as determined from the discrete model.

Preferably, the screen of the interface is a touch screen and/or the interface includes a manually operated pointing device, distinct from the screen, such as a mouse or a touch pad. These are various pointing means that can be used by the operator to select the outline or the desired surface on the screen.

Preferably, the interface is also configured to enable a person to associate the selected surface for treatment with one or more treatment parameters. It is thus possible to associate various parameters with different surfaces that have been identified separately. It is then possible to give unique instructions to the automaton, and allow it to carry out the various different requested tasks on the various selected surfaces, even if the treatment parameters are not the same.

Preferably, the surface is selected by combining a plurality of subselections. More precisely, the work that can be carried out by the automaton is not limited to one single continuous surface, but may include various different surfaces that have been identified and that are distinct from one another. Alternatively, the surface for treatment may be continuous, but it may be selected by adding and/or subtracting a plurality of subselections.

In a first embodiment, the screen is configured to display the representation of at least a portion of the surroundings in which the surface for treatment is to be found on the basis of a file containing a 3D model of said surroundings or from a digital file of the surroundings in which the surface for treatment is to be found, the file being in two or three dimensions. In this first embodiment, the interface uses a 3D model of the surroundings in which the automaton is to work: in particular it is possible for the interface to identify the various surfaces in said surroundings from the way they are modeled in the 3D file.

In another embodiment, the screen is configured to display the representation, in particular in three dimensions, of at least a portion of the surroundings in which the surface for treatment is to be found, on the basis of data obtained from the surroundings, e.g. received from means for scanning said surroundings such as a scanner or a 3D camera. Under such circumstances, the interface acts directly in the surroundings where work is to take place to measure or register the information necessary for identifying a surface for treatment. The interface can thus scan the surroundings, or else can use a 3D or other camera to represent, in particular in three dimensions, a portion of the surroundings on its screen. The interface can also perform image processing or can make use of information input by the operator (geometry, outlines, . . . ) in order to determine the various portions of the surroundings. For example, the interface can determine the boundaries or other singularities between surfaces as a function of their brightness, of geometrical elements supplied by the operator, or of other information. Such an embodiment presents the advantage of being directly operational on site and of not requiring prior modeling of the surroundings.

Preferably, one of the facades of a building is the surface for treatment.

Preferably, one of the objects of the surroundings is the surface for treatment.

Preferably, one of the inside surfaces of a room is the surface for treatment.

Preferably, the automaton is configured to move inside the room.

Preferably, the automaton is configured to move in the proximity of the facade.

Preferably, the automaton is configured to move in the proximity of the object.

Preferably, the automaton also comprises:
a base configured to move over the ground; and
a platform mounted on the base and configured to move, at least in part, perpendicularly to the base, e.g. vertically;

the treatment means being mounted on the platform.

Such an automaton thus makes it possible to treat an extensive surface by moving horizontally by means of its base, and by moving vertically by means of its platform. An automaton is thus obtained that can work in autonomous manner without requiring continuous supervision by a person. This serves to reduce the time an operator needs to spend acting on the automaton, and the operator can in turn perform treatment on the surface at the same time as the automaton, e.g. by performing tasks that require particular skills or know-how such as treating specific surfaces such as the outlines of electricity outlets, behind pipes, staircases, . . . .

Preferably, the platform and the base remain stationary while the treatment means are moved, and/or the treatment means remain stationary while the platform or the base is moving. The movements of the automaton are deliberately programmed to be performed separately from one another, in other words: either it is the platform and/or the base that moves, or else it is the treatment means, but never both at the same time. This makes it easier for any people who might be working around the automaton to predict and anticipate its movements, so as to act accordingly.

Preferably, the treatment of a surface for treatment is painting said surface for treatment, sanding said surface for treatment, and/or spraying a plaster coating on said surface for treatment.

Preferably, the surface for treatment is an inside surface of a building. In particular, the surface for treatment may be an inside surface of a house, of an apartment building, or of an office building. In this example, the treatment concerns surfaces that are normally treated by operators, since they involve constraints concerning access (small size to pass through doorways or via the stairs in the building, maximum weight limited by the structure of the building), constraints concerning surface areas (surfaces inside a building are generally smaller and easier for operators to access than outside surfaces), and constraints concerning electrical power supply (no local electrical power supply in a building while it is under construction) that normally lead to the treatment of the surfaces being given to operators to perform rather than to automatons.

Preferably, the surface for treatment may also be an outside surface of a building. Thus, the surface for treatment may be a facade of a building, or indeed the surface of a terrace or a balcony.

In particular, the surface treatment may be treatment that is performed in industrialized and automated manner. Under such circumstances, the treatment may comprise a step of searching for and/or identifying each new surface for treatment, prior to performing the treatment step. Thus, the automaton may be configured to identify a new surface for treatment on a manufacturing line in which surfaces for treatment move in translation past the automaton, or else it may be configured itself to move through a static manufacturing line from one surface for treatment to another. The surfaces for treatment may: either all be identical, or of shape known to the automaton and identifiable in a database of surfaces for treatment, or else of arbitrary shapes but of characteristics (in particular outlines) that can be identified by the automaton.

Preferably, the automaton is configured to pass through openings, and in particular doors, in a building, such as a house, an apartment building, or an office building. For example, the automaton may present a height that is less than or equal to 2.5 meters (m), preferably less than or equal to 2 m. The automaton may also present a width that is less than or equal to 2 m, preferably less than or equal to 1 m. The automaton may also present a length that is less than or equal to 4 m, preferably less than or equal to 2 m. Furthermore, the automaton may present a weight that is less than or equal to 500 kilograms (kg), preferably less than or equal to 250 kg. An automaton is thus obtained that is compact and that can move inside a building: i.e. it can go through doors and can use an elevator.

Furthermore, such characteristics concerning size and weight also enable the automaton to be used in a wide variety of different surroundings, while still remaining operational, in particular because it is easy to handle and it occupies little space.

Preferably, the automaton is configured to move outdoors, e.g. on public ways, such as sidewalks.

Alternatively, the automaton may be configured to move in industrial surroundings such as a manufacturing line.

Preferably, the automaton also includes one or more sensors for locating itself in three dimensions and relative to the surface for treatment, e.g. ultrasound sensors, laser sensors, travel time sensors, video systems, or indeed sensors co-operating with beacons defining at least a portion of the surface for treatment. The purpose of the sensors is to facilitate positioning of the automaton in its surroundings so as to facilitate identifying surfaces for treatment and also so as to define said surfaces in three dimensions.

The automaton may thus include an optical locating system, e.g. one or more cameras such as cameras positioned stereoscopically, enabling the automaton to position itself in three dimensions in its surroundings. This ensures that the movements and operations performed by the automaton are performed with precision.

Preferably, the automaton also includes presence sensors and is configured to limit, or even avoid, any contacts with potential obstacles, e.g. with people. Such sensors serve in particular to preserve the physical integrity of people who might be working or who might be located in the proximity of the automaton. Thus, by virtue of the various sensors, the automaton is configured to detect the presence of such people and to act appropriately in order to avoid injuring them or impeding them. The automaton thus becomes cooperative, since it can assist people in their work, while performing its own work in their proximity. The term "cooperative" is used of an automaton that is capable of working in the proximity of individuals without requiring a barrier.

BRIEF DESCRIPTION OF THE DRAWINGS

Embodiments of the disclosure and its advantages can be better understood on reading the following detailed description of a particular embodiment given by way of non-limiting example and shown in the accompanying drawings, in which.

DETAILED DESCRIPTION

Figure 1:
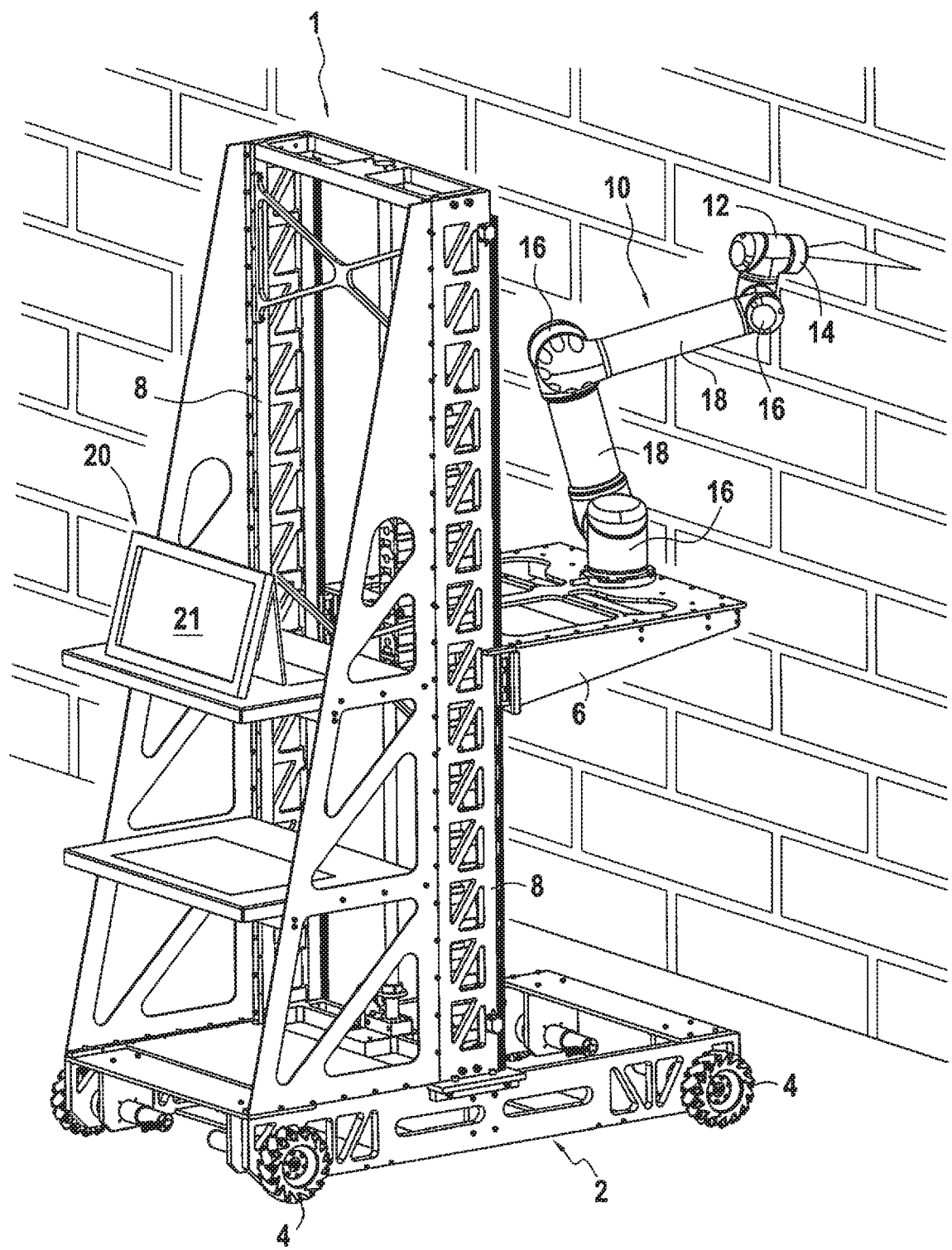
FIG. 1 is a diagrammatic perspective view of an automaton of the present disclosure.

FIG. 1 is a diagrammatic perspective view of an automaton according to embodiments of the present disclosure for treating a surface that is to be treated. The automaton 1 thus comprises a base 2 that enables the automaton to move over the ground and that comprises: movement means, specifically wheels 4 advantageously configured so as to avoid damaging the ground, e.g. being made of or covered in a flexible material such as an elastic material, together with means for driving the wheels, e.g. a motor (not shown). The base 2 constitutes a chassis for the automaton 1 and supports all of the elements of the automaton 1 as described below.

The automaton 1 also has a platform 6. The platform 6 is mounted on the base 2, e.g. via two rails 8 that are mounted substantially perpendicularly on the base 2. The platform 6 is configured to move along the rails 8, i.e. substantially perpendicularly to the base 2 by using drive means (not shown), e.g. a motor. A platform 6 is thus obtained that is capable of moving vertically, for example, in order to reach various different heights of the surface to be treated.

The automaton 1 also has treatment means, specifically an arm 10. The arm 10 is mounted on the platform 6 and comprises firstly a treatment end 12 where a tool is mounted for treating the surface 14, specifically a paint spray nozzle 14, and secondly one or more hinges 16 connecting together one or more arm portions 18. The hinges 16 enable the treatment tool 14 to be moved and steered as desired over all of a surface of given area. The area depends in particular on the lengths of the arm portions 18 and on the amplitudes of the hinges 16. Furthermore, the arm 10 also enables the treatment tool 14 to be moved parallel to the surface for treatment so as to obtain a uniform treatment result.

Finally, the automaton 1 includes a control unit 20. The control unit 20 may be mounted on the base 2 of the automaton 1, or it may be situated remotely at a distance therefrom, or indeed a portion of it may be mounted on the base 2 and a portion may be remote. The control unit 20 serves to control the various means of the automaton 1, in particular the means for driving the base 2, the platform 6, and the arm 10. The control signals are determined in particular by the control unit 20 as a function of instructions and data communicated thereto.

More precisely, the electronic control unit 20 is configured to plan treatment of the surface for treatment, while taking account of the structure of the automaton 1 and while facilitating the work of individuals in the proximity of the automaton 1.

Thus, the control unit 20 may for example be configured initially to subdivide the surface for treatment into subdivisions of area that is less than or equal to a given area. In other words, the surface for treatment is subdivided into portions that can be treated individually solely by movement of the arm, while the platform 6 and the base 2 remain stationary. Thereafter, the control unit is configured to treat the surface in each subdivision by controlling movements of the arm 10. Once the subdivision has been treated, the electronic control unit 20 then causes the subdivision to be changed by moving the platform 6 vertically and/or by driving the base 2 over the ground. Under such circumstances, the automaton 1 works by subdivisions or "cells", each subdivision corresponding to a surface area that can be treated solely by movements of the arm 10 of the automaton 1. Thereafter, the automaton 1 moves from subdivision to subdivision, by moving the platform 6 and/or the base 2.

The subdivisions may be obtained by splitting the surface for treatment into a regular rectangular grid with lines that correspond to movements of the platform 6 and of the base 2, specifically vertical lines and horizontal lines. Once the surface for treatment has been split up by the control unit 20, it can then control the automaton 1 to treat said various subdivisions in succession. Preferably, all of the subdivisions that correspond to the same position for the base 2, i.e. requiring movements only of the arm 10 and of the platform 6 are treated in succession. Thereafter, the base 2 is moved to another position in order to treat in succession all of the corresponding subdivisions, and so on. This limits movements over the ground of the automaton 1, thereby facilitating work of the automaton 1 when individuals are in its proximity.

Within each subdivision, the treatment applied by the automaton 1 can likewise be planned, in particular so as to achieve a rendering that is close to that which would be provided by a professional. For example, when the treatment involves painting, the control unit 20 may be configured to begin the treatment at one edge or outline of the surface for treatment: such treatment is applied only when the subdivision in question is positioned at the edge of the surface for treatment and is not relevant if the subdivision in question is entirely surrounded by other subdivisions. Such a method corresponds to "picking out", a technique which consists in beginning by working on the outlines of the surface before working on its center.

Once the outline has been done, the control unit 20 can then control the arm 10 so as to treat the remainder of the area of the subdivision, i.e. the inside of the subdivision. To do this work, the control unit 20 may in particular provide for moving the arm 10 within a horizontal or vertical grid, i.e. treating the inside of the subdivision by following certain lines of the outline of said subdivision (horizontal or vertical outlines).

Likewise, when the subdivision includes a particular element, such as a switch or an electricity outlet, the same technique can be used: the control unit 20 may be configured to perform the treatment around the outline of the particular element, prior to performing the treatment between the particular element and the outline of the subdivision.

Once all of the subdivisions have been treated, the automaton 1 can then stop. In the example described above, it should be observed that the surface for treatment is a single surface. Nevertheless, the work of the automaton 1 of the disclosure is not limited to such single surfaces, and it can treat a surface for treatment that comprises a plurality of distinct portions that are separated from one another. Under such circumstances, each portion of the surface for treatment is worked in the manner described above, i.e. specifically it is subdivided into subdivisions that are worked in succession. When a portion is finished, the control unit 20 controls the base 2 and/or the platform 6 so as to move to another portion of the surface for treatment that has not been treated.

In practice, such a movement may take place firstly by giving each distinct portion of the surface for treatment a specific working reference frame used by the automaton 1 for treating said distinct portion of the surface, and secondly by positioning the various specific working reference frames relative to one another in a single overall reference frame so as to enable the automaton 1 to move from one distinct portion of the surface for treatment to another distinct portion of the surface for treatment. For example, the various portions of the surface for treatment may be two walls of a room, e.g. two contiguous walls that present an angle relative to each other, or indeed two parallel walls that are spaced apart and face each other. In either situation, on passing from one portion of the surface to another, the automaton 1 is obliged to re-orient itself relative to the portion of the surface for treatment, prior to beginning treatment of said portion of the surface.

In order to select the surfaces for treatment by the automaton, its interface includes a screen 21 configured to display a portion of the surroundings, i.e. the room, adjacent facades, or the object, on which the automaton is to work. Such a display is shown in particular in the various FIGS. 2 to 6.

Figure 2:
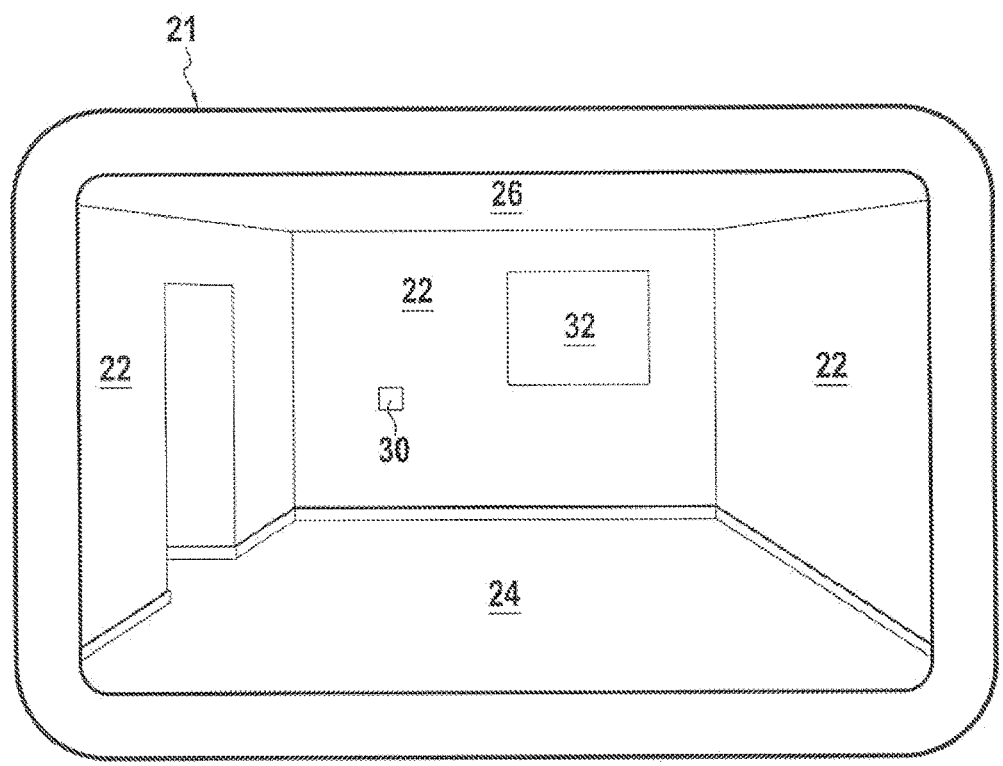
FIGS. 2 to 4 show a first method of selecting a surface via the interface of the automaton of the present disclosure.
Figure 3:
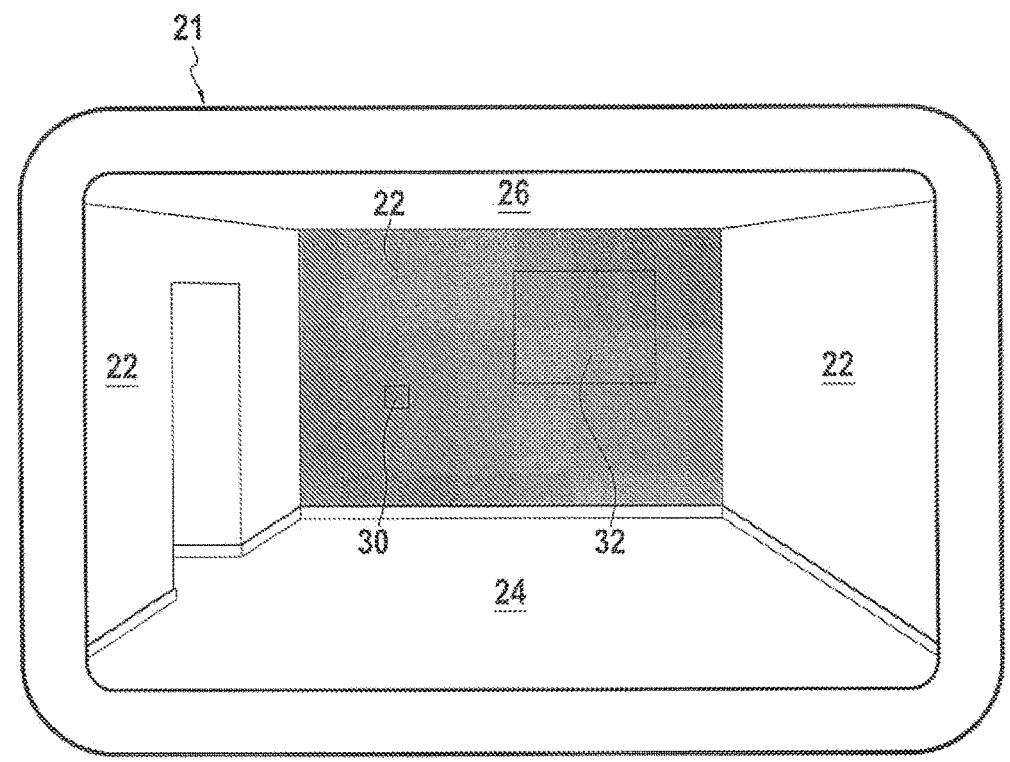
Figure 4:
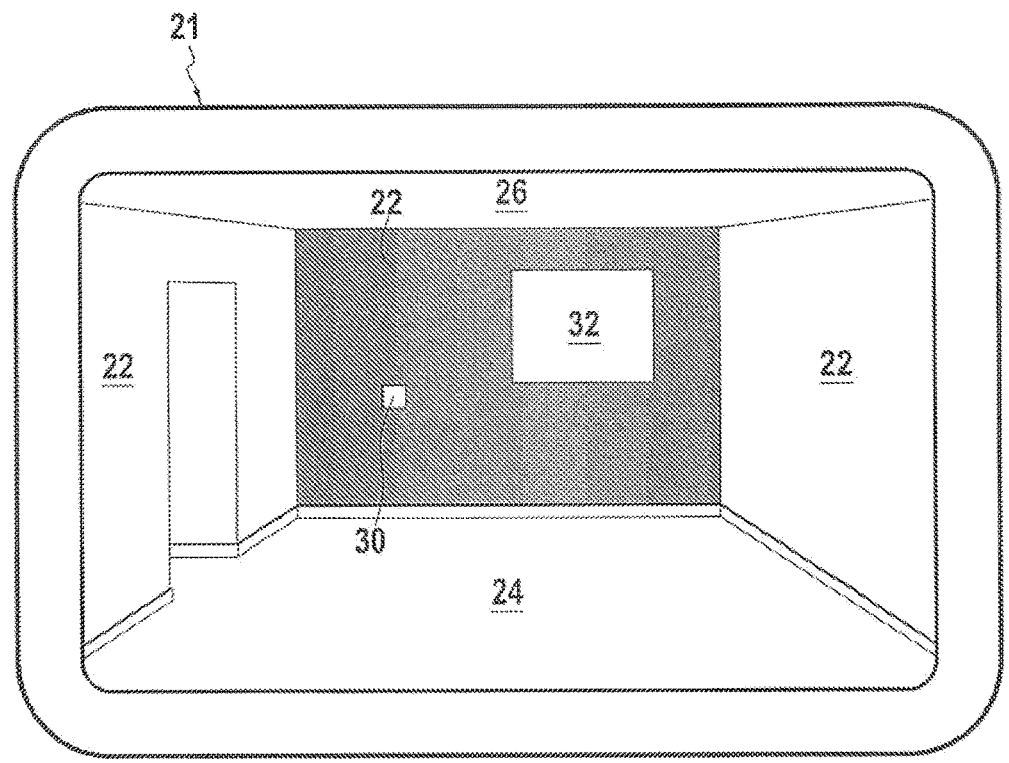

FIGS. 2 to 4 show a first method of selecting a surface via the interface. In this first method, it is considered that the interface is configured to identify the various surfaces displayed on its screen 21. It is also considered that the surface for treatment is an inside surface of a room, and that the surroundings of the surface for treatment comprise the room in which the surface for treatment is to be found.

Thus, FIG. 2 shows a portion of the room as displayed on the screen 21 of the interface. By way of example, the portion of the room may comprise three walls 22, a floor 24, a ceiling 26, and also a switch 30 and a defined portion 32 of the wall, specifically a window, for example. Each of these elements is defined by a closed outline known to the interface, and thus constitutes a surface that is determined for the interface.

The various determined surfaces are thus displayed on the screen 21 of the interface and can then be selected by the operator, e.g. by means of a finger if the screen 21 is a touch screen, or else by using a pointing device.

FIG. 3 shows the display on the screen 21 after selecting a selected determined surface, in particular the surface of the far wall 22. Since the closed outline of the far wall 22 also contains a switch 30 and the wall portion 32, all three determined surfaces are considered as being selected by the interface.

Nevertheless, it is equally possible to exclude the treatment from the determined surface that corresponds to the switch 30 and from the determined surface that corresponds to the wall portion 32, by re-selecting these surfaces specifically after they have already been selected beforehand. These two determined surfaces 30 and 32 are then excluded from the surface that is to be treated by the automaton (see FIG. 4).

The surface(s) that is/are to be treated by the automaton 1 can thus be indicated quickly and easily on the interface.

Figure 5:
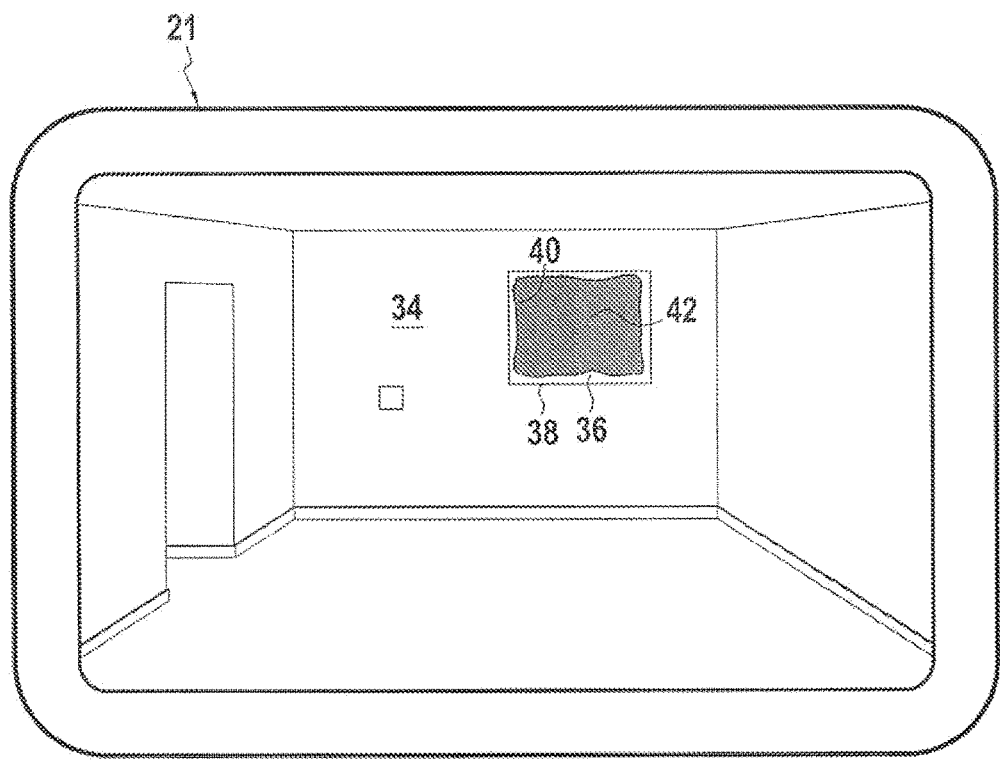
FIGS. 5 and 6 show a second method of selecting a surface via the interface of the automaton of the present disclosure.
Figure 6:
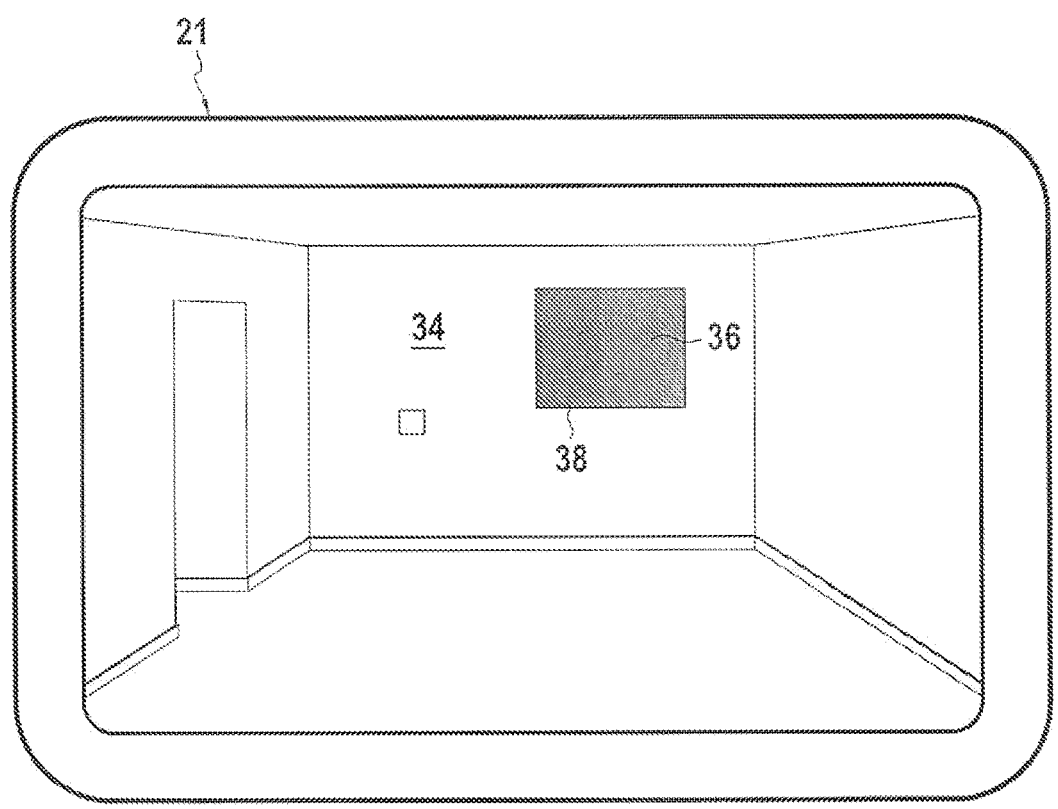

FIGS. 5 and 6 show a second method of selecting a surface via the interface. In this second method, it is considered that the interface is not configured to identify the various surfaces displayed on its screen 21.

In this second method, the portion of the room that is displayed on the screen 21 of the interface may be the result of scanning the room with a scanner or a 3D camera. Alternatively, the portion of the room that is displayed may be a representation of the room obtained from a photograph or as drawn directly by the operator, together with information input by the operator, such as the dimensions or the shape of the various element(s) displayed on the screen.

FIG. 5 shows a room portion as displayed on the screen 21 of the interface. The room portion may include in particular a wall 34 that itself has a portion 36 that has been defined by an outline 38 visible on the wall 34. The room portion displayed on the screen 21 may in particular be obtained by a scanner or by photographing the room.

In order to select a surface for treatment, and in particular the surface 36 as defined by the outline 38, the operator then traces a closed outline 40 on the screen to define a defined surface 42. Since the outline 40 is traced by hand by the operator, it does not correspond exactly to the outline 38 of the surface 36 for treatment.

The interface can then modify the outline 40 of the defined surface 42 so as to make it correspond with singularities displayed on the screen 21, specifically with the outline 38. The selected surface is then modified so as to correspond to the surface 36, which is the surface that is to be treated by the automaton 1 (FIG. 6).

It is thus possible to indicate on the interface the surface(s) that is/are to be treated by the automaton 1, without requiring any prior modeling of the room.

Whatever the method of selecting the surface for treatment, the control unit 20 may also enable an operator to specify the tasks that are to be performed together with their parameters, and also to take cognizance of various status messages or warnings detected by the control unit 20. Thus, the control unit 20 may enable the operator to specify: treatment parameters, e.g. concerning sanding (speed, force, . . . ) or painting (number of coats to be applied, type of paint, quantity of paint, pattern, interleaving of coats, overlapping two contiguous passes, . . . ); the various zones of the surface for treatment, in particular when the treatment parameters are not to be uniform over the entire surface for treatment, but need to change in compliance with determined data.

In order to enable the automaton 1 to locate itself and move in three dimensions so as to treat the various surfaces, it may include sensors. The sensors may involve various different technologies depending on the amplitudes and/or the accuracies of the distances involved. Thus, the automaton 1 may have two distance sensors, e.g. ultrasound sensors, that are mounted in the treatment plane of the arm 10 and that serve to determine firstly the distance between the surface for treatment and the automaton 1, and secondly the angle between the axis of the automaton 1 and the surface for treatment. By means of these sensors, it is thus possible to ensure that the arm 10 does indeed perform the treatment at the proper distance from the surface for treatment, and does so while moving parallel thereto.

Alternatively, when the treatment requires contact with the surface for treatment, e.g. sanding, the distance to the surface for treatment and possibly also the angle between the axis of the automaton 1 and the surface for treatment, may be determined directly by the treatment tool, using internal resistance sensors that are used for monitoring the force that is applied to the surface for treatment.

The automaton 1 may also have travel time sensors, e.g. a laser sensor, for monitoring the position of the automaton 1 in its surroundings. For this purpose, beacons may also be positioned at various locations that are identified by the automaton 1, so as to guarantee that it is indeed facing the surface portion for treatment. Such sensors also make it possible to ensure that the movements of the base 2 take place parallel to the surface for treatment, so that the junctions between the various subdivisions coincide.

Alternatively, in addition to the sensors or as a replacement for the sensors, it is also possible to provide one or more cameras enabling the automaton 1 to locate its position in its surroundings in three dimensions. Thus, two cameras that are stereoscopically positioned can enable the control unit 20 to locate itself in three dimensions by determining the distance and the angle between the automaton 1 and surfaces for treatment or surfaces defining the surroundings in which it moves. This may also enable the automaton 1 to move from one surface portion for treatment to another, when these portions are distinct and separate from each other, as described above.

Under all circumstances, a prior step of calibrating the initial position of the automaton 1 in its surroundings may be necessary in order to perform the locating and positioning steps while treating the surface for treatment.

Finally, the automaton 1 may also have presence sensors serving to ensure that the automaton 1 can work in the proximity of individuals without colliding with them or injuring them. For example, the automaton 1 may have optical sensors forming a barrier between the zone in which the automaton 1 moves and more particularly the zone in which the platform 6 and the arm 10 moves, and the remainder of the surroundings. Thus, if an object is detected intruding into said movement zone, control of the platform 6 and of the arm 10 may be interrupted in order to be certain to avoid injuring a person or to avoid damaging the automaton 1. In addition, or in the alternative, the control unit 20 may monitor the control of the various movement means of the automaton 1, e.g. involving the base 2 or the platform 6, in order to detect an obstruction, if any, to a movement control signal. Under such circumstances, the control signal may be interrupted, or even reversed, and the automaton 1 may wait on standby until a person has come to verify the reason for the obstruction. This ensures that the automaton 1 can indeed move among individuals without running the risk of injuring them.

Thus, by means of embodiments of the disclosure, it becomes possible to use an automaton to treat a surface for treatment while still enabling individuals to act in the proximity of the automaton. In particular, inputting instructions identifying the surfaces for treatment is made easy by the specific interface of the automaton. The automaton can thus act as an assistant within a worksite, in particular in order to perform the most repetitive of tasks that do not require particular skills. In particular, it can perform painting treatments, e.g. by spraying paint onto the surface, or indeed sanding, e.g. by rotating abrasion means over the surface for treatment, or indeed applying a plaster coating, e.g. by spraying.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Notably, although some features, concepts or aspects of the inventions may be described herein as being a preferred or advantageous arrangement or method, such description is not intended to suggest that such feature is required or necessary unless expressly so stated.

The invention claimed is:

1. An automaton for treating a surface for treatment, the automaton comprising a treatment device having a movable end configured to treat an inside surface of a building such as a surface walls, facades, and/or ceilings, and an interface configured to indicate to the automaton the surface that is to be treated, wherein the interface comprises a screen configured to display a representation of at least a portion of the surroundings in which the surface for treatment is to be found, on the basis of data obtained from the surroundings or from a digital the of the surroundings in two or three dimensions, and wherein the interface is configured to enable a person to select the surface for treatment on the representation displayed on the screen, wherein the data is received by the interface from a scanner, a 3D camera, other camera or a digital file to represent, in three dimensions, a portion of the surroundings on its screen, wherein the automaton is autonomous and further comprises sensors and/or one or more cameras enabling the automaton to locate its position in the building in three dimensions, wherein the interface is configured to enable a person: to select the surface for treatment by defining at least one closed outline on the representation displayed on the screen in order to define a defined surface, and wherein the interface is configured to identify at least one singularity in the portion of the surroundings displayed on the screen and wherein the interface is configured to automatically modify the outline defined by the person on, so as to make the outline match with one or more of said singularities, in case there is at least one singularity in proximity of said outline.

2. The automaton according to claim 1, wherein the interface is also configured to display information about the operation of the automaton.

3. The automaton according to claim 1, wherein the interface is configured to identify, in the portion of the surroundings that is displayed on the screen, at least one determined surface that is surrounded by a closed outline.

4. The automaton according to claim 1, wherein the interface is configured to enable a person: to select the surface for treatment by selecting, on the representation displayed on the screen, at least one determined surface surrounded by a closed outline, and possibly to exclude at least a portion of said determined surface that is not to be treated by selecting, on the representation displayed on the screen, a determined portion surrounded by a closed outline that is situated inside said determined surface.

5. The automaton according to claim 1, wherein the screen of the interface is a touch screen.

6. The automaton according to claim 1, wherein the screen is configured to display the representation of at least a portion of the surroundings in which the surface for treatment is to be found on the basis of a file containing a 3D model of said surroundings.

7. The automaton according to claim 1, wherein the data obtained in the surroundings is received by scanning said surroundings.

8. The automaton according to claim 1, further comprising:
a base configured to move over the ground; and
a platform mounted on the base and configured to move, at least in part, perpendicularly to the base;
and wherein the treatment device are mounted on the platform.

9. The automaton according to claim 1, wherein the surface treatment comprises at least one of painting, sanding, and spraying a coating.

10. The automaton according to claim 1, wherein the screen is configured to display a three-dimensional representation of at least a portion of the surroundings in which the surface for treatment is to be found, on the basis of data obtained from the surroundings or from a digital file of the surroundings in two or three dimensions.

11. The automaton according to claim 1, wherein the interface is configured to display the operating parameters or any anomalies of the automaton.

12. The automaton according to claim 1, wherein the interface is configured to enable a person to exclude at least a portion of said defined surface that is not to be treated by making a closed outline on the representation displayed on the screen in order to define a defined portion situated inside said defined surface.

13. The automaton according to claim 1, wherein said at least one singularity in the portion of the surroundings displayed on the screen is one or more corners or one or more edges.

14. The automaton according to claim 6, wherein the screen is configured to display the representation in three-dimensions of at least a portion of the surroundings in which the surface for treatment is to be found on the basis of a file containing a 3D model of said surroundings.

15. The automaton according to claim 1, further comprising presence sensors and configured to limit, or avoid, contact with potential obstacles.

16. The automaton according to claim 1, also comprising optical sensors forming a barrier between a zone in which the automaton moves and the remainder of the surroundings.

\* \* \* \* \*